Feb. 25, 1969  R. H. PREWITT ET AL  3,430,250
SCRATCH STRAIN RECORDER
Filed Aug. 21, 1967  Sheet 1 of 2
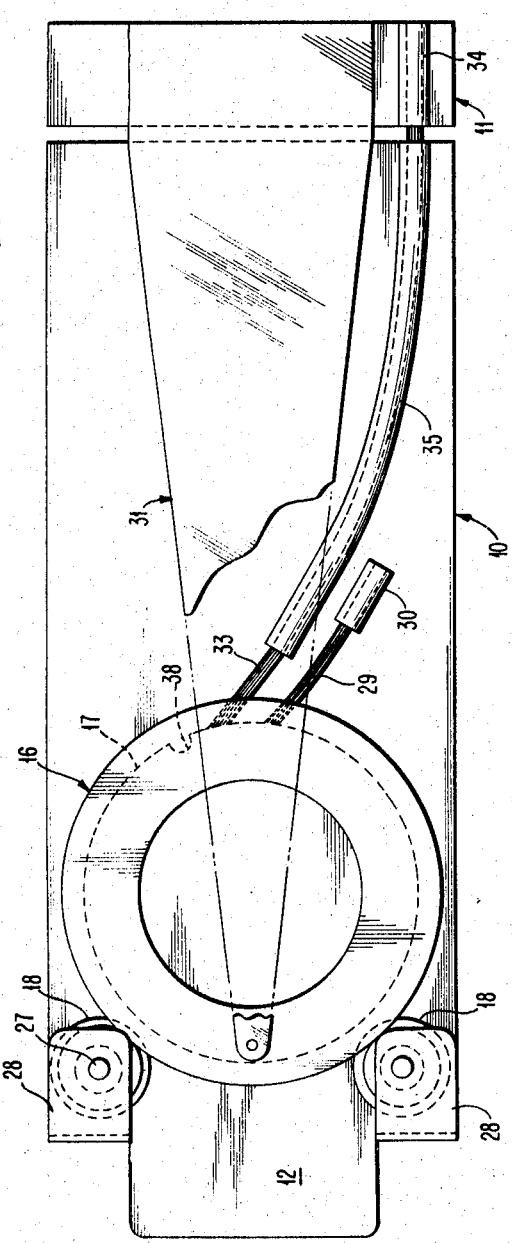
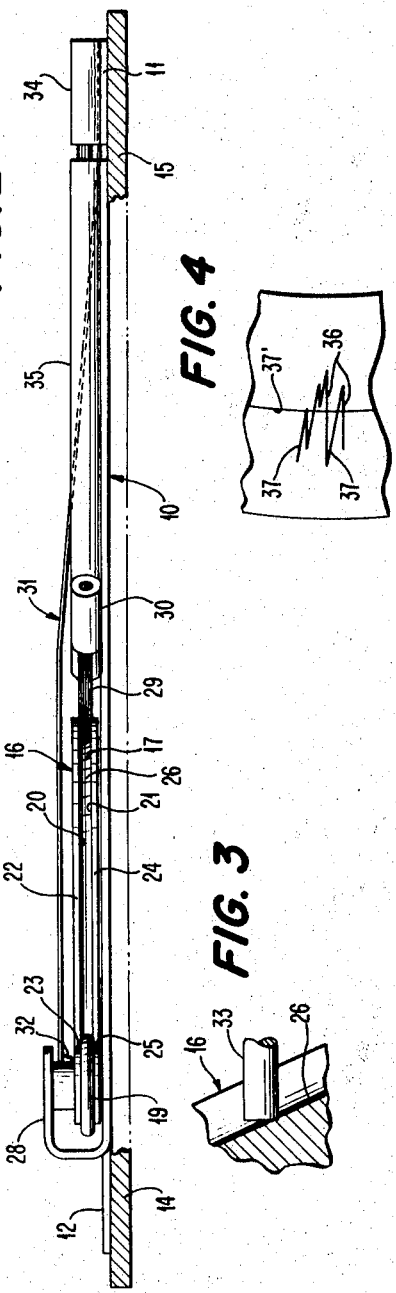
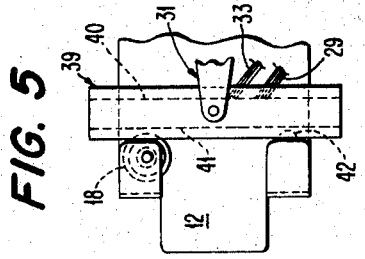
INVENTORS.
RICHARD H. PREWITT
VOLKER SCHMIDT
BY Frank C. Leach Jr.
THEIR ATTORNEY.

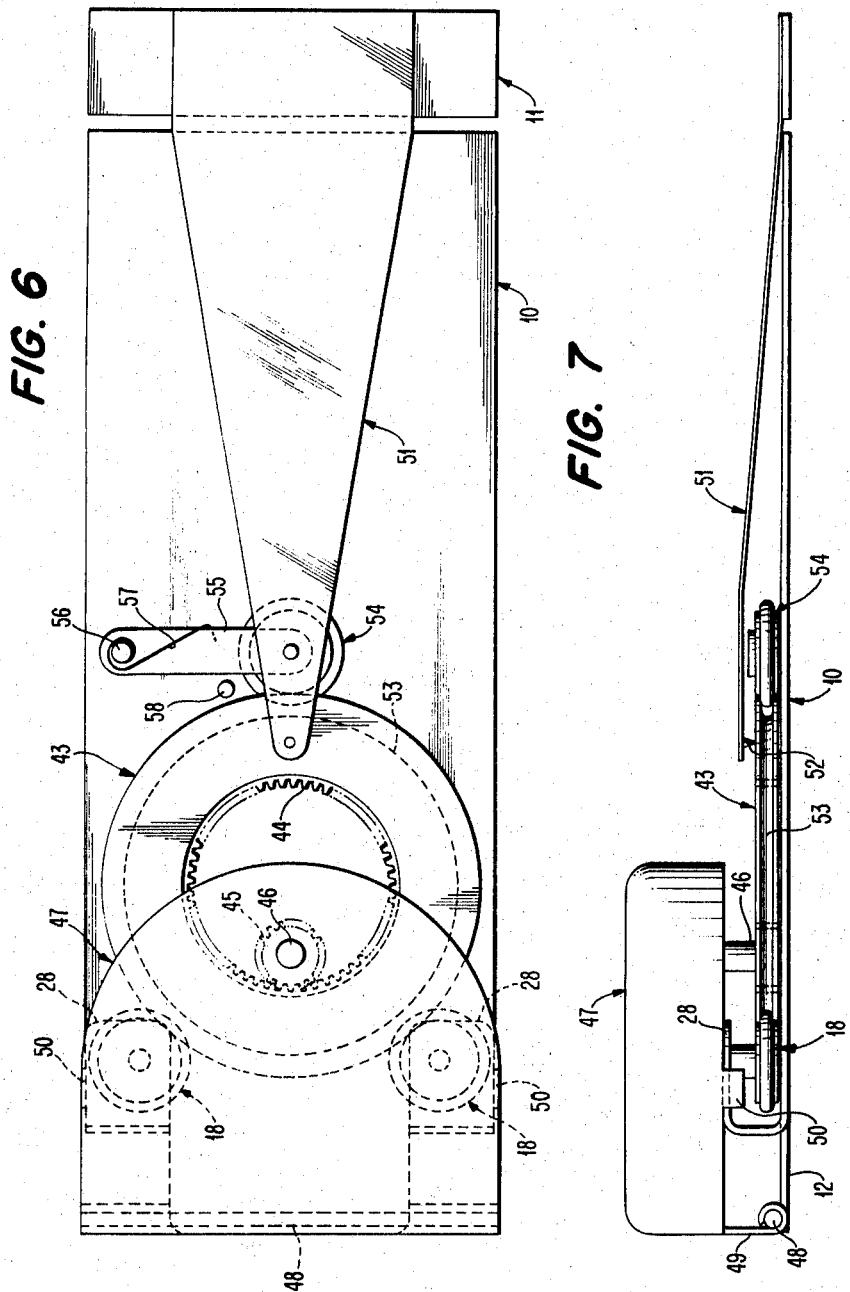

United States Patent Office 3,430,250
Patented Feb. 25, 1969

3,430,250
SCRATCH STRAIN RECORDER
Richard H. Prewitt, 304 W. 3rd St., Lexington, Ky. 40508, and Volker Schmidt, Lexington, Ky.; said Schmidt assignor to said Prewitt
Filed Aug. 21, 1967, Ser. No. 661,905
U.S. Cl. 346—7                    18 Claims
Int. Cl. G01d 15/02

ABSTRACT OF THE DISCLOSURE

A scratch strain gauge has two base plates, which are attached to two spaced areas of a work that is to have the strains to which it is subjected recorded. One of the plates has an annular target rotatably mounted thereon and has means mounted thereon to prevent the target from rotating in one direction. The other of the plates has a scratch arm attached thereto with its scratch element engaging the upper surface of the annular target and forming scratches thereon in response to strains of opposite senses on the work. The other plate also has means attached thereto for rotating the annular target in the opposite direction when the plates are moved toward each other due to a compression strain in the work. In another form of the invention, the annular target is driven continuously by a timing mechanism, and the preventing and rotating means are eliminated. In still another embodiment, the annular target is replaced by a rectangular shaped target in which both the scratches on the rectangular shaped target and the advancement of the rectangular shaped target are due to movement of one of the plates with respect to the other.

---

This invention relates to a recording instrument and, more particularly, to a scratch strain gauge for permanently recording strains.

Scratch strain gauges are employed to permanently record strains to which a part is subjected. The gauge is anchored to spaced areas of the part and has a scratch element to scratch a record on a target. In order to separate successive recorded scratches so that the sequence of strains and their respective amplitudes can be read under a microscope, it is necessary to produce relative movement between the target and the scratch element.

One prior scratch strain gauge is shown and described in U.S. Patent 2,932,967 to Richard H. Prewitt et al. In this scratch strain gauge, a substantially rectangular shaped target is moved axially when strains of one sense occur and is held against movement when strains of the other sense occur. The scratch element is moved transversely of the target during strains of either sense. This scratch strain gauge requires three longitudinally spaced areas of anchorage to the part that is to have strains recorded.

The present invention is an improvement of the recording instrument of the aforesaid Prewitt et al. patent. The present invention requires only two longitudinally spaced areas of anchorage to the part so as to record the strains to which the part is subjected. Thus, the present invention permits utilization of a smaller instrument than has previously been available. This is particularly useful when the gauge is employed in relatively small areas.

In the recording instrument of the aforesaid Prewitt et al. patent, the possibility exists that the target would not be moved axially each time that it was desired because of the friction between the target and its support structure. The present invention satisfactorily solves this problem by reducing the friction against which the target must move and by providing positive engagement of the target moving means with the target.

When using a rectangular shaped target, the amount of recorded data is limited to the length of the target. Since the length of the target in the scratch strain gauge of the aforesaid Prewitt et al. patent must be related to the size of the remainder of the instrument in order to be utilized in relatively small areas, the length of the target is limited. Thus, when using the recording instrument of the aforesaid Prewitt et al. patent, it is necessary to periodically replace the target if all of the strains are to be recorded.

The present invention satisfactorily solves the foregoing problem by employing a target having an annular configuration. The annular shaped target of the present invention may record a substantially greater number of strains thereon than is available from a rectangular shaped target of similar size. Furthermore, if there is no objection to recording the strains over the previously recorded strains, the target of the present invention may record an endless amount of strain data.

An object of this invention is to provide a scratch strain gauge that requires only two areas of anchorage to the work that is to have its strains recorded.

Another object of this invention is to provide a scratch strain gauge in which the inputs for moving both the scratch member and the target are mounted on the same part of the gauge that is attached to one of the anchorage areas.

A further object of this invention is to provide a scratch strain gauge in which the driving members for the target are retained in a desired relation to each other.

Other objects of this invention will be readily perceived from the following description, claims, and drawings.

This invention relates to a recording instrument having scratch means and a rotatably mounted target disposed for recording strains in opposite senses by scratches formed on the target due to movement of the scratch means. The instrument has means responsive to strains in one of the senses only for rotating the target relative to the scratch means and means to prevent the target from rotating during strains in the opposite sense.

This invention also relates to a target for use with a recording instrument of the scratch strain gauge type in which scratches are recorded on the target by scratch means to indicate strains of opposite senses in a work to which the instrument is attached. The target comprises a circular shaped member adapted to be rotatably mounted and to have one of its surfaces positioned for cooperation with the scratch means to record the strains thereon. The circular member has a continuous groove formed in its periphery to receive means to rotatably mount the target.

This invention further relates to a recording instrument having scratch means and a rotatably mounted target disposed for recording strains in opposite senses by scratches formed on the target due to movement of the scratch means. The target has a groove formed in its periphery with one of the opposite walls in the groove engaged by rotatably mounted means to rotatably support the targets. The instrument has means to rotate the target relative to the scratch means.

This invention also relates to a recording instrument having scratch means and a target disposed for recording strains in opposite senses by scratches formed on the target due to movement of the scratch means. The target has at least one groove formed it its periphery with rotatably mounted means engaging one of the opposite walls of the groove to support the target for movement. The target is moved by means engaging the base of the groove in response to strains in one of the senses only. Movement of the target during strains of the opposite sense is prevented by additional means engaging the base of the groove.

This invention further relates to a recording instrument having a first plate adapted to be secured to a work susceptible to strains in opposite senses and a second plate adapted to be secured to the same work in spaced relation to the securing of the first plate to the work. The first plate has a target mounted thereon for movement relative thereto, and the second plate has scratch means mounted thereon for engaging the target to record strains of the work on the target. The second plate has means secured thereto for moving the target only when the work is subjected to strains in one of the senses while means mounted on the first plate prevent movement of the target when the work is subjected to strains in the opposite sense.

This invention still further relates to a recording instrument having scratch means and a target disposed for recording strains in opposite senses by scratches formed on the target due to movement of the scratch means. The target is moved by means responsive to strains in one of the senses only while suitable means prevent the target from moving during the strains of the opposite sense. The responsive means comprises a plurality of separate members adapted to engage the target when strains in the one sense occur. The instrument has means to guide the separate members in aligned relation to each other to insure engagement of the separate members with the target.

The attached drawings illustrate preferred embodiments of the invention, in which:

FIGURE 1 is a top plan view of the recording instrument of the present invention;

FIGURE 2 is a side elevational view of the instrument of FIGURE 1 and shows the instrument mounted on a part that is to have its strains recorded by the instrument of the present invention;

FIGURE 3 is an enlarged plan view of a portion of one of the drive members for advancing the target;

FIGURE 4 is a top plan view of a portion of the target and showing scratches recorded thereon;

FIGURE 5 is a top plan view of another form of the target of the present invention;

FIGURE 6 is a top plan view of another embodiment of the present invention in which the target is driven by a timing mechanism; and FIGURE 7 is a side elevational view of the gauge of FIGURE 6.

Referring to the drawings and particularly FIGURE 1, there is shown a scratch strain gauge of the present invention having an elongated base plate 10 and an end base plate 11, which is spaced from the base plate 10. Each of the base plates 10 and 11 is relatively thin and may be formed of any suitable material.

The base plate 10 has a lip 12 on its end, which is remote from the end base plate 11. The lip 12 is adapted to be secured to an area 14 (see FIGURE 2) of a work or part that is to have its strains recorded by the scratch strain gauge of the present invention. The end base plate 11 is adapted to be secured to a second area 15 of the same work or part. As shown in FIGURE 2, the two areas 14 and 15 are longitudinally spaced from each other.

The elongated base plate 10 supports an annular member 16, which functions as the target of the scratch strain gauge of the present invention. The annular member 16 has a continuous groove 17 formed in its periphery to receive a pair of rollers 18, which are rotatably mounted on the base plate 10.

Each of the rollers 18 has an enlarged central portion 19 (see FIGURE 2), which abuts against one of opposite side walls 20 and 21 of the groove 17 in the annular member 16. The periphery of the annular member 16 has an upper portion 22, which is above the groove 17, engaging an upper circular portion 23 of each of the rollers 18. Similarly, the periphery of the annular member 16 has a lower portion 24, which is below the groove 17, bearing against a lower circular portion 25 of each of the rollers 18.

The rollers 18 are mounted with respect to the annular member 16 so that the large central portion 19 of the roller does not extend into the groove 17 to engage its base or bottom 26. Thus, friction between the rollers 18 and the annular member 16 is reduced to permit easier rotation of the annular member 16. Furthermore, the engagement between the circular portions 23 and 25 of each of the rollers 18 and the portions 22 and 24 of the periphery of the annular member 16 minimizes any friction on the upper or lower surface of the annular member 16 due to mounting thereof. Accordingly, the rotatable mounting of the annular member 16 by the rollers 18 is a substantially friction-free mounting.

Each of the rollers 18 is rotatably mounted on a shaft 27, which has its lower end fixedly mounted in the base plate 10. The upper end of each of the shafts 27 is fixedly mounted in an ear 28, which is formed by bending a portion of the base plate 10 adjacent the lip 12.

The annular member 16 is held against clockwise (as viewed in FIGURE 1) rotation by a retaining or holding means. The retaining or holding means comprises one or more relatively thin members 29, which are adapted to engage against the base or bottom 26 of the groove 17. The members 29 may be formed of any suitable material as long as the edges, which engage the bottom or base 26 of the groove 17 in the annular member 16, are sharp. As an example, the member 29 could be a wire formed of metal and have its end ground or could be formed of glass fiber and have its end broken to provide the sharp edge.

The members 29 are secured to a tubular member 30 by suitable means. If the members 29 are metal wires, they could be secured by soldering or crimping, for example. If the members 29 are glass fiber, they could be secured to the tubular member 30 by a suitable adhesive or crimping, for example. The tubular member 30 is fixedly secured to the upper surface of the base plate 10 by suitable means such as soldering or welding, for example.

The scratch means for forming the scratches on the upper surface of the annular member 16, which is the target, includes an arm 31 having one end fixedly secured to the end base plate 11. The arm 31 has a pointed element 32 at its end, which is remote from the end base plate 11, for forming the scratches on the upper surface of the annular member 16. The pointed element 32 extends downwardly from the arm 31, which overlies the annular member 16, and is urged downwardly against the annular member 16 due to the flexing force of the arm 31.

Accordingly, each time that there is relative motion between the areas 14 and 15 of the work, there is relative motion between the base plate 10 and the end base plate 11 so as to cause the pointed element 32 to form a scratch on the upper surface of the annular member 16. It should be understood that the material of the pointed element 32 must be capable of scratching the upper surface of the annular member 16. Furthermore, the annular member 16, the arm 31, the base plate 10, and the rollers 18 are preferably formed of the same material as the material of the work if temperature effects are important so that all have the same coefficient of expansion.

The annular member 16 is rotated in a counterclockwise direction by a driving means. The driving means includes a plurality of relatively thin members 33, which have their edges sharpened to engage the bottom or base 26 of the groove 17 in the same manner as the members 29. The members 33 are preferably formed of the same material as the members 29. It should be understood that the members 29 and 33 are of a harder material than the annular member 16 so that the edges of the members 29 and 33 bite into the bottom or base 26 of the groove 17 as shown in FIGURE 3 for one of the members 33.

The members 33 are secured to the end base plate 11 through a tubular member 34. The tubular member 34 is secured to the upper surface of the end base plate 11 by suitable means such as soldering or welding, for example. Each of the members 33 is fixedly secured to the tubular member 34 by suitable means in the same manner as the members 29 are secured to the tubular member 30.

The members 33 extend through a curved tubular member 35, which is fixedly secured to the upper surface of the base plate 10 by suitable means such as welding or soldering, for example. The tubular member 35 guides the members 33 so that they are retained in a desired relation to each other to insure positive engagement with the base or bottom 26 of the groove 17. This insures that the annular member 16 rotates counterclockwise (as viewed in FIGURE 1) during each movement of the end base plate 11 toward the base plate 10.

Considering the operation of the scratch strain gauge of the present invention, the elongated base plate 10 is secured to the area 14 of the work by suitable means such as adhesive being applied between the bottom surface of the lip 12 and the upper surface of the area 14 of the work. Of course, if desired, the lip 12 could be provided with suitable holes to receive screws for engaging the area 14 of the work. The remainder of the bottom surface of the base plate 10 is coated with a suitable material to prevent any adhesive bonding between the remainder of the base plate 10 and the work. Similarly, at least the portion of the upper surface of the base plate 10 over which the arm 31 lies is coated with a material to prevent adhesive bonding therebetween.

The bottom surface of the end base plate 11 is coated with a suitable material to fixedly attach the end base plate 11 to the area 15 of the work. If desired, the member 11 could be attached by screws in the same manner as described for the attachment of the lip 12 to the area 14 of the work.

With the plates 10 and 11 fixedly secured to the work, any strain in one sense will move the end plate 11 away from the base plate 10. This causes a scratch 36 (see FIGURE 4) to be formed on the upper surface of the annular member 16. When the work is subjected to a strain in the opposite sense, the plate 11 is moved toward the plate 10 to cause the pointed element 32 of the scratch arm 31 to form a scratch 37. However, the scratch 37 is formed along a diagonal because the drive members 33 also rotate the annular member 16 counterclockwise (as viewed in FIGURE 1) when the end plate 11 is moved toward the base plate 10. The sharp edges of the ends of the thin members 33 engage the base or bottom 26 of the groove 17 of the annular member 16 to cause rotation of the annular member 16.

Since the thin members 29 retain or hold the annular member 16 against clockwise (as viewed in FIGURE 1) rotation, the movement of the end base plate 11 away from the base plate 10 does not cause rotation of the annular member 16. During this movement of the end plate 11 away from the base plate 10, the ends of the thin members 33 are pulled through the tubular member 35 toward the end base plate 11. As a result, the ends of the thin members 33 slide back along the base or bottom 26 of the groove 17 in the periphery of the annular member 16 with the thin members 29 preventing the annular member 16 from rotating.

Accordingly, the scratches 36 and 37 on the upper surface of the annular member 16 will indicate the strains, in both senses, to which the work is subjected. The amplitude of each of the strains is readily discerned by the length of the scratch 36 or 37.

Furthermore, the distance from a neutral position, which is indicated by a base line 37', may be determined. The base line 37' is formed by manually rotating the annular member 16 through 360° to indicate a known neutral strain.

It it is desired to prevent continuous recording (over-recording) of strains on the annular member 16 by the pointed element 32 of the scratch arm 31, it is necessary to stop rotation of the annular member 16. Accordingly, a receptacle 38 is formed in the annular member 16 in the base or bottom 26 of the groove 17 to function as the stop. When the annular member 16 is initially mounted on the base plate 10, the receptacle 38 is disposed just beyond the drive members 33. Thus, the annular member 16 may make almost a complete revolution before the receptacle 38 receives the retaining member 29 to block the annular member 16 against further movement.

It should be understood that the annular member 16 is inserted by pushing the member 16 inwardly from the side of the base plate 10 closest to the tubular member 30. In removing the annular member 16, it is pulled in the direction of the side of the base plate 10 closest to the tubular member 30. Both the members 29 and the drive members 33 have sufficient resiliency to permit this movement.

Referring to FIGURE 5, there is shown another form of the target in which the annular member 16 is replaced by a rectangular shaped member 39. The member 39 functions as a target in the same manner as the annular member 16 although it can only record a limited amount of data compared to the annular target. It would be necessary to relocate the pointed element 32 to insure that it engages the member 39 during movements of the end base plate 11 relative to the base plate 10.

The member 39 has grooves 40 and 41 formed along its periphery on parallel sides thereof. In the modification of FIGURE 5, the base plate 10 has one of the rollers 18 still rotatably mounted thereon, but the other of the rollers 18 is replaced by a metallic friction pad 42, which has a high coefficient of friction. Both the roller 18 and the friction pad 42 extend into the groove 41 in the member 39 but do not engage against the base or bottom thereof.

The groove 40 of the member 39 receives both the retaining members 29 and the drive members 33. These are mounted in the same manner as when the annular member 16 is employed as the target.

When the end base plate 11 is moved toward the base plate 10 due to a strain in one sense in the embodiment of FIGURE 5, the drive members 33 will advance the target 39 axially. The resultant force of the drive members 33 is applied toward the roller 18 so as to cause the target 39 to be advanced axially.

When the drive members 33 are moved along the base of the groove 40 due to the end base plate 11 moving away from the base plate 10, the resultant force of the drive members 33 is applied toward the friction pad 42. As a result, this creates additional friction to prevent the member 39 from moving backwards when the drive members 33 are moved back. Additionally, the retaining members 29 aid in preventing backward movement of the target 39 when the end base plate 11 is moved away from the base plate 10.

Referring to FIGURES 6 and 7, there is shown another form of the present invention in which the target is driven by a timing mechanism rather than being rotated by the strains of one sense in the work. This embodiment permits permanent recording of strains in the work in relation to time.

As shown in FIGURE 6, the target is an annular member 43, which has gear teeth 44 formed thereon for meshing with the teeth of a pinion gear 45. The pinion gear 45 is supported on a shaft 46, which extends into a housing 47 having a timing mechanism therein. The timing mechanism is drivingly connected to the shaft 46 to rotate the pinion gear 45.

The housing 47 is pivotally connected to the lip 12 of the base plate 10. The hinged connection includes a rod 48, which is secured to the lip 12 and extends through arcuate ends of downwardly extending portions 49 of the housing 47. Accordingly, the housing 47 may be pivoted to remove the pinion gear 45 away from engagement with the gear teeth 44 of the annular member 43.

The housing 47 has clips 50 extending downwardly from each side. Each of the clips 50 has a dentent (not shown) for engaging one of the ears 28 to retain the housing 47 in the position in which the pinion gear 45 rotates the annular member 43.

The end base plate 11 has a scratch arm 51 attached thereto. The arm 51 is shorter than the arm 31, which is used with the embodiment of FIGURE 1. The arm 51 has a pointed element 52 extending downwardly therefrom (see FIGURE 7) for engaging the upper surface of the annular member 43 on the side adjacent the end plate 11 to form scratches thereon when the arm 51 moves relative to the annular member 43. This is necessary because of the position of the timing mechanism.

The rollers 18 are disposed within a groove 53 in the same manner as they are disposed within the groove 17 in the periphery of the annular member 16 of FIGURE 1. In order to retain the annular member 43 in its rotatably mounted position, a roller 54, which has the same configuration as each of the rollers 18, is rotatably mounted on one end of an arm 55, which is pivotally mounted on the base plate 10 by a pin 56. The roller 54 extends into the groove 53 in the periphery of the annular member 43 in the same manner as the rollers 18. Thus, the annular member 43 is rotatably mounted on the base plate 10 in a substantially friction-free manner.

The roller 54 is biased into continuous engagement with the annular member 43 through a spring 57 acting on the arm 55. Inward movement of the arm 55 by the spring 57 when the annular member 43 is not rotatably mounted on the base plate 10 is limited by a stop pin 58.

When one of the annular members 43 is to be mounted on the base plate 10, it is necessary for the housing 47 to be pivoted counterclockwise (as viewed in FIGURE 7) about the rod 48 to remove the pinion gear 45 from a position in which it would engage the annular member 43 to block its entry. Likewise, the arm 55 must be pivoted counterclockwise (as viewed in FIGURE 6) about the pin 56 to permit insertion of the annular member 43 between the rollers 18 and the roller 54. As soon as the annular member 43 is positioned on the base plate 10, the arm 55 is released to permit the roller 54 to have its enlarged central portion extend into the groove 53 in the periphery of the annular member 43. With the annular member 43 rotatably mounted in relation to the base plate 10, the housing 47 is returned to the position of FIGURES 6 and 7 wherein the pinion gear 45 meshes with the gear teeth 44.

Accordingly, as each strain in the work occurs, the arm 51 is moved relative to the annular member 43, which is the target, to form a scratch on its upper surface. Since the annular member 43 is continuously rotated by the timing mechanism within the housing 47 through the pinion gear 45, none of the scratches is on a radius of the annular member 43 but each is formed along a diagonal. Thus, when the timing mechanism ceases to drive the annular member 43 and the annular member 43 is removed from the base plate 10, a record of the strains on the work in accordance with the time is permanently recorded on the annular member 43.

While the target has been shown as an annular member, it should be understood that it could be a circular member. While the timing mechanism has been described as driving the target continuously, it should be understood that the timing mechanism could drive the target intermittently.

It should be understood that the gauge may be made longer by extending the lip 12. This would permit recording of greater amplitudes of motion of the pointed element 32 or 52 and/or motion of the drive members 33 whereby the length of the scratches 36 and 37 and the distance between the scratches may be increased.

While the gauge of the present invention has been shown as attached to the work at two longitudinally spaced areas, it should be understood that the gauge could be attached to three longitudinally spaced areas. In such a situation, the scratch arm 31 would be anchored to a different area of work than the drive members 33 and on the same side or opposite sides of the annular member 16. The mounting of the drive members 33 and the scratch arm 31 on opposite sides of the annular member 16 is particularly desirable where the force to activate the drive members 33 may affect the accuracy of the scratches recorded by the pointed element 32 on the annular member 16.

It should be understood that the amount of motion of the drive members 33 will be proportional to the distance between the attachment of the drive members 33 to the work and the attachment of the base plate 10 to the work. The amount of motion of the pointed element 32 is similarly proportional. Accordingly, by properly positioning the drive members 33 and the scratch arm 31, many cycles of scratches and/or scratches of relatively large ampltitudes may be recorded.

An advantage of this invention is that its round targets record more data than may be recorded on a rectangular shaped target. Another advantage of this invention is that it requires only two longitudinally spaced areas of anchorage to the work. A further advantage of this invention is that the target is easier to move relative to the base plate on which it is mounted. Still another advantage of this invention is that the gauge is relatively small in comparison with prior gauges while providing a larger target area.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

We claim:

1. A recording instrument comprising scratch means, a rotatably mounted target disposed for recording motions in opposite senses by scratches formed on said target due to movement of said scratch means, means responsive to motions in one of the senses only for rotating said target relative to said scratch means, and means to prevent said target from rotating during motions in the opposite sense.

2. The instrument according to claim 1 including two spaced plates, said target being rotatably mounted on one of said plates, and said scratch means and said responsive means being mounted on the other of said plates.

3. The instrument according to claim 2 in which said preventing means is mounted on said one plate.

4. The instrument according to claim 1 in which said target has a groove formed in its periphery, said responsive means and said preventing means extend into said groove to engage said target, and said scratch means engages the upper surface of said target.

5. The instrument according to claim 3 in which said target has a groove formed in its periphery, said responsive means and said preventing means extend into said groove to engage said target, and said scratch means engages the upper surface of said target.

6. The instrument according to claim 5 in which said one plate has a pair of rollers rotatably mounted thereon, each of said rollers engaging one of the opposite walls of said groove in the periphery of said target to rotatably mount said target on said one plate.

7. The instrument according to claim 1 including means to stop rotation of said target after a predetermined rotation of said target.

8. A recording instrument comprising scratch means, a rotatably mounted target disposed for recording motions in opposite senses by scratches formed on said target due to movement of said scratch means, said target having a groove formed in its periphery, rotatably mounted means engaging one of the opposite walls of said groove to rotatably support said target, and means to rotate said target relative to said scratch means.

9. The instrument according to claim 8 in which said rotating means includes timing means connected to said target to rotate said target.

10. The instrument according to claim 9 including two spaced plates, said target being rotatably mounted on one of said plates, said scratch means being mounted on the other of said plates, and said timing means being mounted on said one plate.

11. A recording instrument having scratch means, a target disposed for recording motions in opposite senses by scratches formed on said target due to movement of said scratch means, said target having at least one groove formed in its periphery, rotatably mounted means engaging one of the opposite walls of said groove to support said target for movement, means engaging the base of said groove to move said target in response to motions in one of the senses only, and means to prevent said target from moving during motions of the opposite sense.

12. The instrument according to claim 11 in which said target has a substantially rectangular shape, said target has a groove formed in each of two parallel sides of its periphery, said rotatably mounted means cooperates with one of said grooves, and said responsive means and said preventing means cooperates with the other of said grooves.

13. The instrument according to claim 11 in which said rotatably mounted means includes a pair of spaced rollers to rotatably mount said target.

14. A recording instrument comprising a first plate adapted to be secured to a member susceptible to motions in opposite senses, a second plate adapted to be secured to the same member in spaced relation to the securing of said first plate to the member, said first plate having a target mounted thereon for movement relative thereto, said second plate having scratch means mounted thereon for engaging said target to record motions of the member on said target, said second plate having means secured thereto for moving said target only when the member is subjected to motions in one of the senses, and means mounted on said first plate to prevent movement of said target when the member is subjected to motions in the opposite sense.

15. A recording instrument having scratch means, a target disposed for recording motions in opposite senses by scratches formed on said target due to movement of said scratch means, means responsive to motions in one of the senses only to move said target, means to prevent said target from moving during motions of the opposite sense, said responsive means comprising a plurality of separate members adapted to engage said target when motions in the one sense occur, and means to guide said separate members in aligned relation to each other to insure engagement of said separate members with said target.

16. The instrument according to claim 15 including two spaced plates, said target being mounted on one of said plates, said scratch means being mounted on the other of said plates, each of said separate members being secured to said other plate, and said guide means being secured to said one plate.

17. A target for use with a recording instrument of the type in which scratch means record scratches on the target to indicate motions of opposite senses in a member to which the instrument is attached, said target comprising a circular shaped member adapted to be rotatably mounted and to have one of its surfaces positioned for cooperation with the scratch means to record the motions thereon, said circular shaped member having a continuous groove formed in its periphery to receive means to rotatably mount said target.

18. The target according to claim 17 in which said circular shaped member has an annular configuration and said member has a receptacle formed in the base of said groove to receive means to prevent rotation of said target in either direction.

References Cited

UNITED STATES PATENTS

| | | | |
|---|---|---|---|
| 2,081,579 | 5/1937 | De Forest | 73—88 |
| 2,932,967 | 4/1960 | Prewitt et al. | 73—88 |

RICHARD B. WILKINSON, *Primary Examiner.*

JOSEPH W. HARTARY, *Assistant Examiner.*

U.S. Cl. X.R.

73—88; 346—77, 124, 137